United States Patent [19]

Oriola et al.

[11] Patent Number: 5,011,121
[45] Date of Patent: Apr. 30, 1991

[54] SEAL FOR GAS SPRING

[75] Inventors: Ralph Oriola, Danielson, Conn.; Charles F. Romine, Atlantic Beach, N.C.; Edward O. Meisner, Elkhart, Ind.

[73] Assignee: Eagle-Picher Industries, Inc., Cincinnati, Ohio

[21] Appl. No.: 38,829

[22] Filed: Apr. 15, 1987

[51] Int. Cl.⁵ .................................................. F16F 5/00
[52] U.S. Cl. ............................... 267/64.11; 92/168; 267/64.28; 277/27; 277/177
[58] Field of Search .................. 267/64.11, 64.28, 120; 188/322.21, 322.16, 322.17, 352, 269; 277/177, 173, 3, 27, 19, 214, 225, 213, 208; 92/168, 153, 154, 159; 141/4, 98, 349, 392; 137/853, 854, 860, 843

[56] References Cited

U.S. PATENT DOCUMENTS

| | | | |
|---|---|---|---|
| Re. 28,329 | 2/1975 | Nicholls | 267/65 |
| 2,054,863 | 9/1936 | Oliver | 277/214 X |
| 2,196,337 | 4/1940 | Loweke | 277/215 X |
| 2,349,346 | 5/1944 | Goepfrich | 277/214 X |
| 2,643,147 | 6/1953 | Funkhouser et al. | 267/129 X |
| 3,190,635 | 6/1965 | Wustenhagen et al. | 267/65 |
| 3,197,191 | 7/1965 | Axthammer | 267/65 |
| 3,207,498 | 9/1965 | Wustenhagen et al. | 267/65 |
| 3,214,182 | 10/1965 | Herbrugger | 277/215 X |
| 3,287,008 | 11/1966 | Fernandez | 295/641 |
| 3,595,552 | 7/1971 | Nicholls | 267/65 |
| 3,788,630 | 1/1974 | Koller | 267/65 |
| 3,804,217 | 4/1974 | Keijzer et al. | 188/322 |
| 3,856,287 | 12/1974 | Freitag | 267/64 |
| 3,919,509 | 11/1975 | Schnitzius | 200/61 |
| 4,030,716 | 6/1977 | Freitag | 267/64 |
| 4,108,423 | 8/1978 | Skubal | 267/64 |
| 4,114,866 | 9/1978 | Kato | 267/64.28 |
| 4,194,731 | 3/1980 | Marx | 267/65 |
| 4,219,190 | 8/1980 | Nagase | 267/64.28 |
| 4,230,309 | 10/1980 | Schnitzius | 267/120 |
| 4,263,488 | 4/1981 | Freitag et al. | 200/52 |
| 4,270,635 | 6/1981 | Wossner | 188/322 |
| 4,335,871 | 6/1982 | Molders | 267/64.28 |
| 4,475,577 | 10/1984 | Cubalchini | 267/64.28 X |
| 4,491,160 | 1/1985 | Axthammer et al. | 141/349 |
| 4,544,144 | 10/1985 | Ishida et al. | 267/64.15 |
| 4,548,389 | 10/1985 | Smith et al. | 267/64.11 |
| 4,556,092 | 12/1985 | Cubalchini | 188/322.21 X |
| 4,635,908 | 1/1987 | Ludwig | 267/64.28 X |
| 4,650,044 | 3/1987 | Gugle | 267/64.28 X |

FOREIGN PATENT DOCUMENTS

| | | |
|---|---|---|
| 3130760 | 2/1983 | Fed. Rep. of Germany . |
| 1156365 | 5/1958 | France . |
| 1391524 | 6/1965 | France . |
| 2359325 | 2/1978 | France . |
| 460089 | 1/1937 | United Kingdom . |
| 1440389 | 6/1976 | United Kingdom . |
| 2065266A | 6/1981 | United Kingdom . |

Primary Examiner—Douglas C. Butler
Attorney, Agent, or Firm—Wood, Herron & Evans

[57] ABSTRACT

A gas spring having a cylinder, a piston within the cylinder and a piston rod projecting out of the cylinder. A seal between the rod and cylinder is formed by a cup-shaped member presenting an inwardly-projecting skirt that functions as a one-way check valve. A second or inner seal may be optionally placed within the cup-shaped member to form a lubricant-retaining chamber.

5 Claims, 2 Drawing Sheets

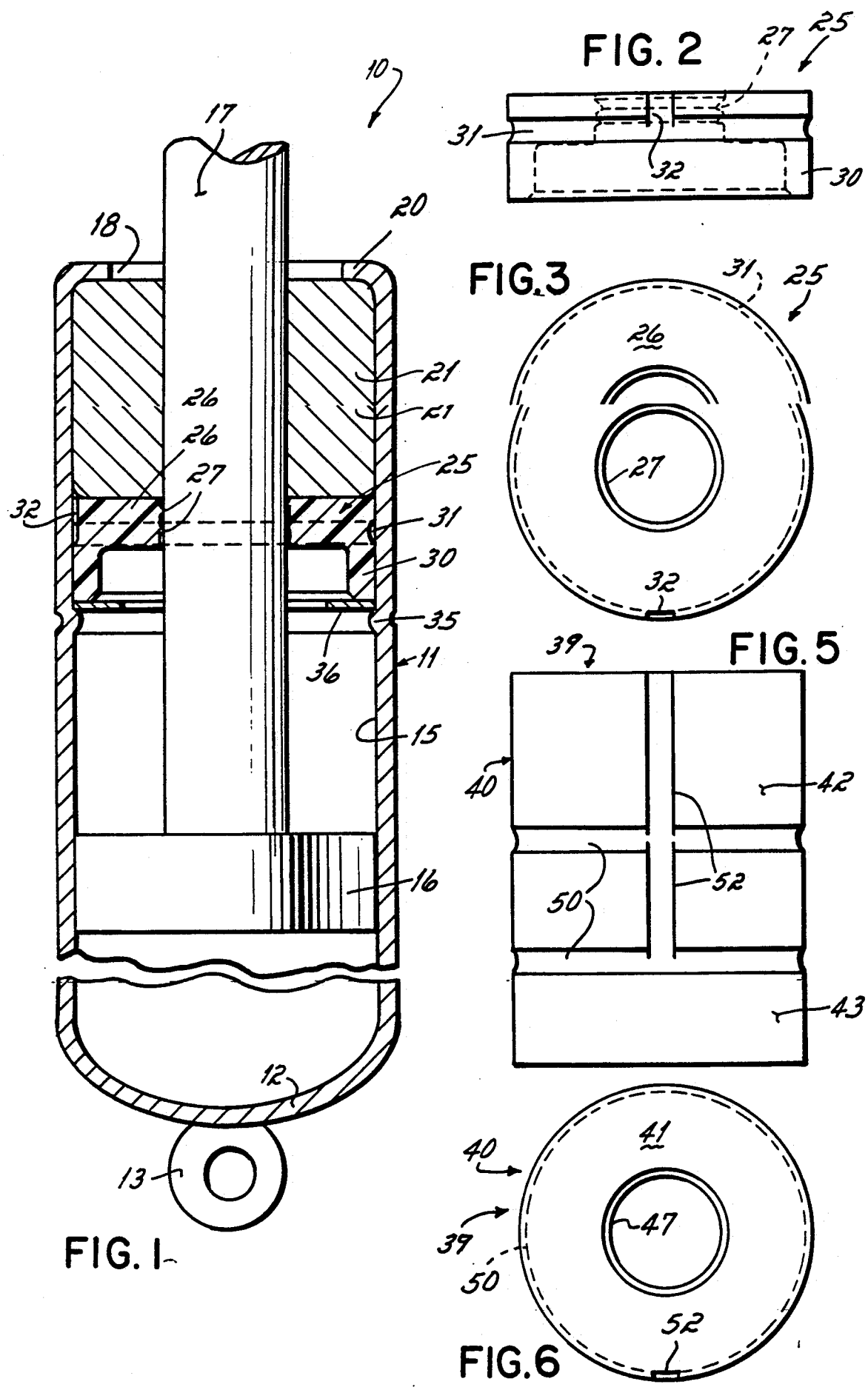

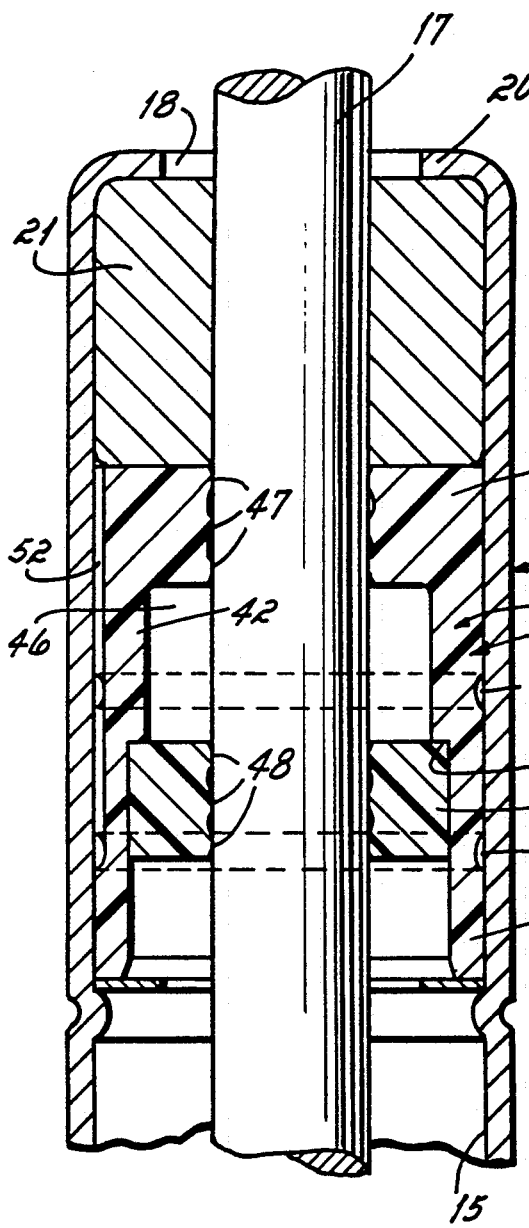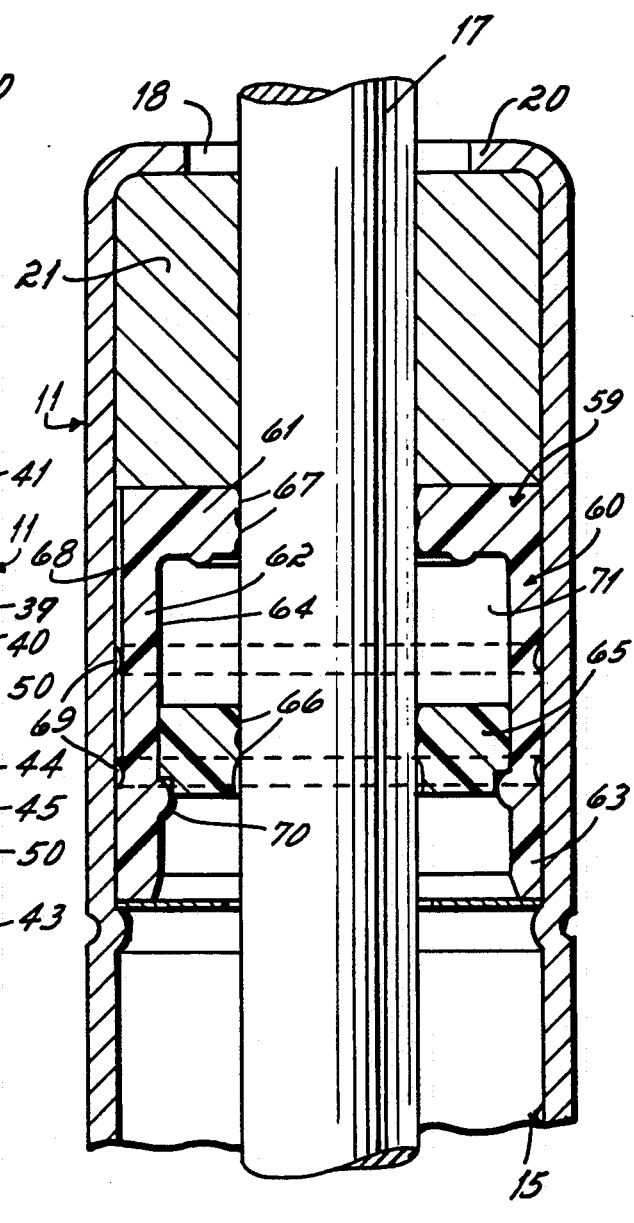

SEAL FOR GAS SPRING

This invention relates to a gas spring, and more particularly, to the seal between the piston and rod and cylinder that are principal components of the gas spring. The gas spring is a device used principally for providing lifting support for an automobile hatchback. It includes a cylinder closed at one end and pivotally mounted to one part of the automobile. A piston and rod are slidably mounted within the cylinder with a rod projecting from the other end of the cylinder and pivotally connected to the other part of the automobile. A seal is formed between the piston rod and the cylinder, and the cylinder is charged with a gas, such as nitrogen, the gas forming a pneumatic cushion that provides the spring action. The gas spring has been known for a number of years, and many patents showing gas spring seals have been issued. U.S. Pat. Nos. 4,194,731 and 4,548,389 are representative.

SUMMARY OF THE INVENTION

An objective of the invention has been to provide a seal which is more simply and easily assembled and which is simple and economical to charge with a high pressure gas.

It is a further objective of the invention to provide a seal that provides a chamber for a charge of lubricant for the piston rod.

The objectives of the invention are attained by providing, as a seal between the piston rod and cylinder, a cup-shaped element having a transverse wall through which the rod passes, a seal being formed between the rod and the transverse wall. The cup-shaped element has a cylindrical portion terminating in a skirt which extends into the cylinder and forms a one-way check valve that permits gas to pass the skirt into the interior of the cylinder but blocks its escape from the cylinder. That cup-shaped element is useful alone as a seal.

Optionally and preferably, a flexible washer surrounds the rod and is mounted within the cylinder wall of the cup-shaped element. The washer and the cup-shaped element between them form a chamber for housing a lubricant. The inner cylinder wall of the cup-shaped element may have a shoulder against which the washer seats, thereby providing a constant volume chamber. Alternatively, the washer may be slidable within the chamber to provide a variable volume chamber. With either chamber, if one of the seals fails, the other will still operate to keep the gas spring functional. The advantage of the constant volume chamber is the retention of the lubricant even if the seal on the transverse wall of the cup-shaped element fails. In this case, the chamber remains in tact since it is not under pressure, whereas in the case of the variable volume chamber the gas pressure in the spring would quickly dissipate all of the lubricant.

An advantage for the variable volume chamber would be a more consistent lubricating rate during the entire life of the chamber because the lubricant is always under pressure. In contrast, the constant volume chamber would cause some lessening of lube rates as the amount of the lubricant dissipates during its life.

Among the advantages of the invention is the ease with which the seal can be assembled. The outer seal (cup-shaped element) and inner seal (washer) can be assembled with the lubricant, added to the chamber, all of these assembling steps being performed outside of the cylinder. Thereafter the assembly is applied to the piston rod.

The spring with the seal of the present invention is easily sealed with gas. It need only be inserted in a pressure chamber. Thereafter, the pressure of the gas (nitrogen) in the chamber is raised to the desired level. Gas will necessarily fill the cylinder through the one-way check valve formed by the skirt. After being filled, the skirt, acting as a check valve, blocks the escape of the gas from the cylinder.

The several objectives and advantages of the present invention will become more readily apparent from the following detailed description taken in conjunction with the drawings.

BRIEF DESCRIPTION OF THE DRAWINGS

FIG. 1 is a cross-sectional view of a gas spring without a lubricant chamber;

FIG. 2 is a side elevational view of the cup-shape element;

FIG. 3 is a top plan view of the cup-shaped element;

FIG. 4 is a fragmentary cross-sectional view of the gas spring with a constant volume lubricant chamber;

FIG. 5 is a side elevational view of the cup-shaped element the embodiment of FIG. 4;

FIG. 6 is a top plan view of the cup-shaped element for the embodiment of FIG. 4; and FIG. 7 is a fragmentary cross-sectional view of a variable volume chamber gas spring.

DETAILED DESCRIPTION OF THE INVENTION

As shown in FIG. 1, the gas spring 10 includes a cylinder 11 which is closed by a wall 12 at one end. A ring 13 is provided for pivotally mounting the gas spring to an automobile part or the like. The cylinder has an inner cylindrical wall 15 along which a piston 16 slides. The piston is attached to, a rod 17 which projects through an open end 18 of the cylinder. The open end 18 of the cylinder is formed by an inwardly-projecting flange 20 which is integral with the cylinder walls. A rod guide 21 is fixedly mounted at the open end of the cylinder.

Adjacent the rod guide is the seal 25 formed of a low temperature elastomer such as nitrile. The seal 25 is cup-shaped and has a transverse wall 26. The transverse wall has a central bore formed with sealing lands or lips 27 which engage the rod to form a gas-tight seal with respect to the rod. An inwardly-projecting cylindrical skirt 30 is integral with the transverse wall 26 to complete the formation of the cup-shaped element. The skirt lies against the inner cylindrical wall 15 of the cylinder and forms a one-way check valve with it to permit the flow of gas through the open end 18 past the skirt and into the cylinder. After the filling pressure is relieved, the pressure of the gas within the cylinder pushes the skirt outwardly against the cylinder walls to form a seal therewith.

As shown in FIGS. 2 and 3, the seal 25 has a circumferential slot 31 and at least one axial slot 32. The circumferential slot lies adjacent the skirt 30. The combined slots provide a passageway for the pressurizing gas (usually nitrogen) to flow past the transverse wall 26 to the skirt. The skirt is flexible enough to be deflected inwardly when under gas pressure, thereby permitting the gas to flow to the interior of the cylinder.

The cylinder wall, immediately adjacent the end of the skirt 30, may have a circular boss 35 that blocks inwardly movement of the seal. Preferably a steel washer 36 is disposed between the seal and the circular boss 35.

FIG. 4 illustrates a seal in which a constant volume lubricant chamber is provided. All elements of the embodiment of FIG. 4 are identical to those of FIG. 1 except the seal per se. The seal 39 is a cup-shaped element 40 having a transverse wall 41, a cylindrical chamber-forming wall 42 and a cylindrical skirt 43. A shoulder 44 is formed between the chamber-forming wall 42 and the skirt 43. A flexible washer 45 is seated on the shoulder 44, thereby defining a chamber 46 which is filled with a viscous lubricant. The transverse wall 41 of a cup-shaped element is provided with projecting lands or lips 47 which engage the rod and form a gas-tight seal with respect to it. Similarly, the washer 45 has lips or lands 48 tightly pressing against the rod 17 to form a gas-tight seal 48 with respect to it. In the case of the constant volume lubricant chamber of FIG. 4, the seal provided by the washer lands 48 is the primary seal. If it breaks down, the seal provided by lands 47 takes over to prevent the escape of gas. The lubricant acts to provide a gas barrier supplementing the sealing action of the lands 47 and 48.

Referring to FIGS. 5 and 6, the seal 40 has two spaced circumferential grooves 50 and at least one axial groove 52 that connect the outer end of the seal with the circumferential grooves 50. The grooves thus form a passageway for the flow of gas from the outside of the cylinder to the circumferential grooves 50 adjacent the skirt 43.

The embodiment of FIG. 7 contains a variable chamber seal. There, the seal, indicated at 59, includes a cup-shaped element 60 which has a transverse wall 61 and an inwardly-projecting cylindrical wall 62. The cylindrical wall terminates in a skirt 63 at the inner end of the seal 60. A flexible washer 65 is slidably mounted on the inner cylindrical surface 64 of the cup-shaped element 60 and forms a variable volume chamber 71. The washer 65 has inwardly-projecting lips or lands 66 which engage the rod 17 and form a gas-tight seal with it. The transverse element has inwardly-projecting lips or lands 67 to form a gas-tight seal with respect to the rod 17. In this embodiment, the seal 67 formed by the transverse wall 61 is the primary seal in view of the fact that the washer 65 is slidable and will be urged toward the transverse wall by nitrogen under a pressure of 2000-2500 psi.

The outer surface of the seal 60 is formed as in the embodiment of FIG. 4 to provide axial and circumferential slots 68 and 69, respectively, that form a gas passageway to the skirt 63. Immediately adjacent the skirt is a projecting circumferential boss 70 that positions the washer 65 when the chamber 71 is first filled with a lubricant. As the lubricant is used, the inner seal or washer 65 will move toward the transverse wall 61, thereby closing down the volume of the chamber 71.

In the operation of the invention, the cup-shaped element and the washer in both embodiments of FIG. 4 and 7 are assembled on the rod 17. The chamber 46 or 71 is filled with grease. The assembly is slid down on the rod, thereby closing off the grease-filled chamber. The rod and seals are then inserted into the cylinder and the rod guide 21 is inserted after that. The end of the cylinder is cold-formed inwardly to provide the flange 20 that fixes the parts within the cylinder.

The one or more cylinders thus formed are loaded into a pressure chamber. Thereafter, nitrogen under pressure of 2000-2500 psi is introduced. The nitrogen under pressure passes by the rod guide and through the passageways formed by the axial and circumferential slots in the cup-shaped element. The gas flexes the skirt 43 or 63 inwardly, thereby permitting the interior of the cylinder to be filled. Once filled, the external pressure is reduced to atmospheric pressure. Escape of the gas from the cylinder is prevented by the skirt pressing outwardly against the cylinder walls and by the seals formed by the lips bearing against the rod 17.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof.

We claim:

1. In a gas spring having a cylinder, a piston reciprocable in said cylinder, a rod connected to said piston and projecting out of one end of said cylinder, and a rod guide fixed in said one end of said cylinder and having a bore slidably receiving said rod, a seal between said rod and said cylinder comprising, a cup-shaped element having a transverse wall, said transverse wall slidably engaging said rod and forming a gas-tight seal with said rod, an axially-extending skirt integral with said transverse wall, said skirt engaging the inner surface of said cylinder and forming a one-way check valve therewith, and passageway means molded in the outer surface of said cup-shaped element through which gas under pressure flows to said skirt to fill said gas spring.

2. In a gas spring having a cylinder, a piston reciprocal in said cylinder, a rod connected to said piston and projecting out of one end of said cylinder, and a rod guide fixed in said one end of said cylinder and having a bore slidably receiving said rod, a seal between said rod and said cylinder comprising, a cup-shaped element having a transverse wall said transverse wall slidably engaging said rod and forming a gas-tight seal with said rod, an axially-extending skirt integral with said transverse wall, said skirt engaging the inner surface said cylinder and forming a one-way check valve therewith said skirt having an inner wall, a flexible washer surrounding said rod and being spaced from said transverse wall, said flexible washer having sealing lands engaging said rod, the outer surface of said washer engaging the inner surface of said skirt to form a seal therewith, and passageway means molded in the outer surface of said cup-shaped element through which gas under pressure flows to said skirt to fill said gas spring.

3. A gas spring seal as in claim 2 further comprising a charge of lubricant between said washer and said transverse wall.

4. In a gas spring having a cylinder, a piston reciprocable in said piston, a rod connected to said piston and projecting out of one end of said cylinder, and a rod guide fixed in said one end of said cylinder and having a bore slidably receiving said rod, a seal between said rod and said cylinder comprising, a cup-shaped element having a transverse wall, said transverse wall slidably engaging said rod and forming a gas-tight seal with said rod, an axially-extending skirt integral with said transverse wall, said skirt engaging the inner surface of said cylinder and forming a one-way check valve therewith, said skirt having an inner wall, a flexible washer surrounding said rod and slidably engaging said skirt inner wall, said washer being spaced from said transverse wall, and a packing of lubricant between said transverse wall and said washer, and passageway means molded in the outer surface of said cup-shaped element through which gas under pressure flows to said skirt to fill said gas spring.

5. In a gas spring having a cylinder, a piston reciprocable in said piston, a rod connected to said piston and projecting out of one end of said cylinder, and a rod guide fixed in said one end of said cylinder and having a bore slidably receiving said rod, a seal between said rod and said cylinder comprising, a cup-shaped element having a transverse wall, said transverse wall slidably engaging said rod and forming a gas-tight seal with said rod, an axially-extending skirt integral with said transverse wall, said skirt engaging the inner surface of said cylinder and forming a one-way check valve therewith, said cup-shaped element having on its outer surface a circumferential slot intermediate its ends and an axial slot extending from said transverse wall to said circumferential slot, thereby providing a passageway for gas under pressure to said skirt.

* * * * *